(12) United States Patent
Lin et al.

(10) Patent No.: US 8,322,865 B2
(45) Date of Patent: Dec. 4, 2012

(54) PROJECTION APPARATUS AND IMAGE ADJUSTMENT METHOD

(75) Inventors: Tzung-I Lin, Taipei (TW); Yi-Chun Lu, Taipei (TW); Justin Halls, Taipei (TW)

(73) Assignee: Optoma Corporation, New Taipei (TW)

( * ) Notice: Subject to any disclaimer, the term of this patent is extended or adjusted under 35 U.S.C. 154(b) by 367 days.

(21) Appl. No.: 12/725,443

(22) Filed: Mar. 16, 2010

(65) Prior Publication Data

US 2011/0228173 A1 Sep. 22, 2011

(51) Int. Cl.
  *G03B 21/14* (2006.01)
(52) U.S. Cl. ........... 353/84; 353/30; 353/31; 353/85; 353/98; 353/99; 359/889; 349/106
(58) Field of Classification Search ............ 353/30, 353/31, 37, 84, 33, 35, 85, 98, 99, 121, 122; 348/743, 745, 655, 658, 742, 744, 750, 771, 348/835; 359/885, 891, 889, 892; 349/5, 349/7, 8, 9, 80, 104, 106, 108; 345/32, 63, 345/77, 84, 690, 691, 692, 694
See application file for complete search history.

(56) References Cited

U.S. PATENT DOCUMENTS

| | | | |
|---|---|---|---|
| 6,520,648 B2* | 2/2003 | Stark et al. | 353/85 |
| 6,879,451 B1* | 4/2005 | Hewlett et al. | 359/891 |
| 6,912,017 B1* | 6/2005 | Minami et al. | 348/743 |
| 6,967,795 B2* | 11/2005 | Cheng et al. | 359/891 |
| 7,050,122 B2* | 5/2006 | Gibbon et al. | 348/771 |
| 7,113,152 B2* | 9/2006 | Ben-David et al. | 345/32 |
| 7,161,608 B2* | 1/2007 | Pettitt et al. | 345/690 |
| 7,306,340 B2* | 12/2007 | Nakagawa et al. | 353/85 |
| 7,329,009 B2* | 2/2008 | Monch et al. | 353/85 |
| 2006/0109428 A1* | 5/2006 | Liang | 353/84 |
| 2006/0152686 A1* | 7/2006 | Yeralan et al. | 353/84 |
| 2007/0086098 A1* | 4/2007 | Sekiguchi et al. | 359/892 |
| 2008/0158515 A1* | 7/2008 | Candry et al. | 353/31 |
| 2008/0192065 A1 | 8/2008 | Selbrede et al. | |

FOREIGN PATENT DOCUMENTS

| | | |
|---|---|---|
| TW | I236656 | 7/2005 |
| TW | 200737948 | 10/2007 |
| TW | I296483 | 5/2008 |

* cited by examiner

*Primary Examiner* — Georgia Y Epps
*Assistant Examiner* — Sultan Chowdhury
(74) *Attorney, Agent, or Firm* — Jianq Chyun IP Office (57) ABSTRACT

A projection apparatus including an illumination system, a light valve, and a color filtering module is provided. The illumination system is capable of emitting an illumination beam. The light valve is disposed in the transmission path of the illumination beam and capable of converting the illumination beam into an image beam. The color filtering module is disposed in the transmission path of the illumination beam between the illumination system and the light valve and includes a plurality of colored filters and a gray filter. The gray filter is capable of reducing the intensity of the illumination beam passing through the gray filter. An image adjustment method is also provided.

19 Claims, 5 Drawing Sheets

PROJECTION APPARATUS AND IMAGE ADJUSTMENT METHOD

BACKGROUND OF THE INVENTION

1. Field of the Invention

The invention generally relates to a display apparatus and a control method thereof and, in particular, to a projection apparatus and an image adjustment method.

2. Description of Related Art

A kind of the projection apparatus with a single digital micro-mirror device (DMD) uses color sequential display technology. The color sequential display technology uses a color wheel with red, green, and blue filters so as to generate colourful image frames. When the pixel in the image frame is black, the micro-mirror of the DMD rotates to an angle such that the micro-mirror reflects the image beam to a direction along which the image beam does not travel to the projection lens. However, since the rotation angle of the micro-mirror is limited, a little part of the image beam still travel to the projection lens, and is projected on the screen. As a result, the contrast of the image frames is reduced.

Besides, U.S. Patent Application Publication No. 20080192065 discloses a color wheel having red filter, green filter, blue filter, and an opaque sheet. Taiwan Patent No. I296483 discloses an apparatus and a method adjusting an input image. Taiwan Patent No. 200737948 discloses an image processing apparatus. In addition, Taiwan Patent No. I236656 discloses a brightness compensation apparatus and a method for a liquid crystal display.

SUMMARY OF THE INVENTION

Accordingly, the invention is directed to a projection apparatus, capable of providing image frames with higher contrast.

The invention is directed to an image adjustment method capable of making image frames have higher contrast.

Other advantages of the present invention can be further comprehended from the technical features disclosed in the present invention.

One embodiment of the invention provides a projection apparatus including an illumination system, a light valve, and a color filtering module. The illumination system is capable of emitting an illumination beam. The light valve is disposed in the transmission path of the illumination beam and capable of converting the illumination beam into an image beam. The color filtering module is disposed in the transmission path of the illumination beam between the illumination system and the light valve and includes a plurality of colored filters and a gray filter. The gray filter is capable of reducing the intensity of the illumination beam passing through the gray filter.

Another embodiment of the invention provides an image adjustment method for a projection apparatus including following steps. First, an image signal is received. Next, an average brightness of the image signal is calculated. Then, a color filtering module of the projection apparatus is commanded to make a plurality of colored filters of the color filtering module move into the transmission path of an illumination beam emitted by an illumination system of the projection apparatus and make the time for a gray filter of the color filtering module passing through the transmission path of the illumination beam less than the time for any of the colored filters passing through the transmission path of the illumination beam if the average brightness is greater than or equal to a first reference brightness. In addition, the color filtering module is commanded to make the colored filters and the gray filter move into the transmission path of the illumination beam in sequence if the average brightness is less than the first reference brightness and if the image signal is not an all black frame signal.

In summary, the embodiment or embodiments of the invention may have at least one of the following advantages: the projection apparatus according to the embodiment of the invention, since the color filtering module has a gray filter to reduce the intensity of the illumination beam passing through the gray filter, the image frames provided by the projection apparatus have higher contrast. In the image adjustment method according to the embodiment of the invention, since the gray filter moves into the transmission path of the illumination beam to reduce the intensity of the illumination beam when the average brightness of the image signal is less than the first reference brightness, the image frames provided by the projection apparatus have higher contrast.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing,"

"faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
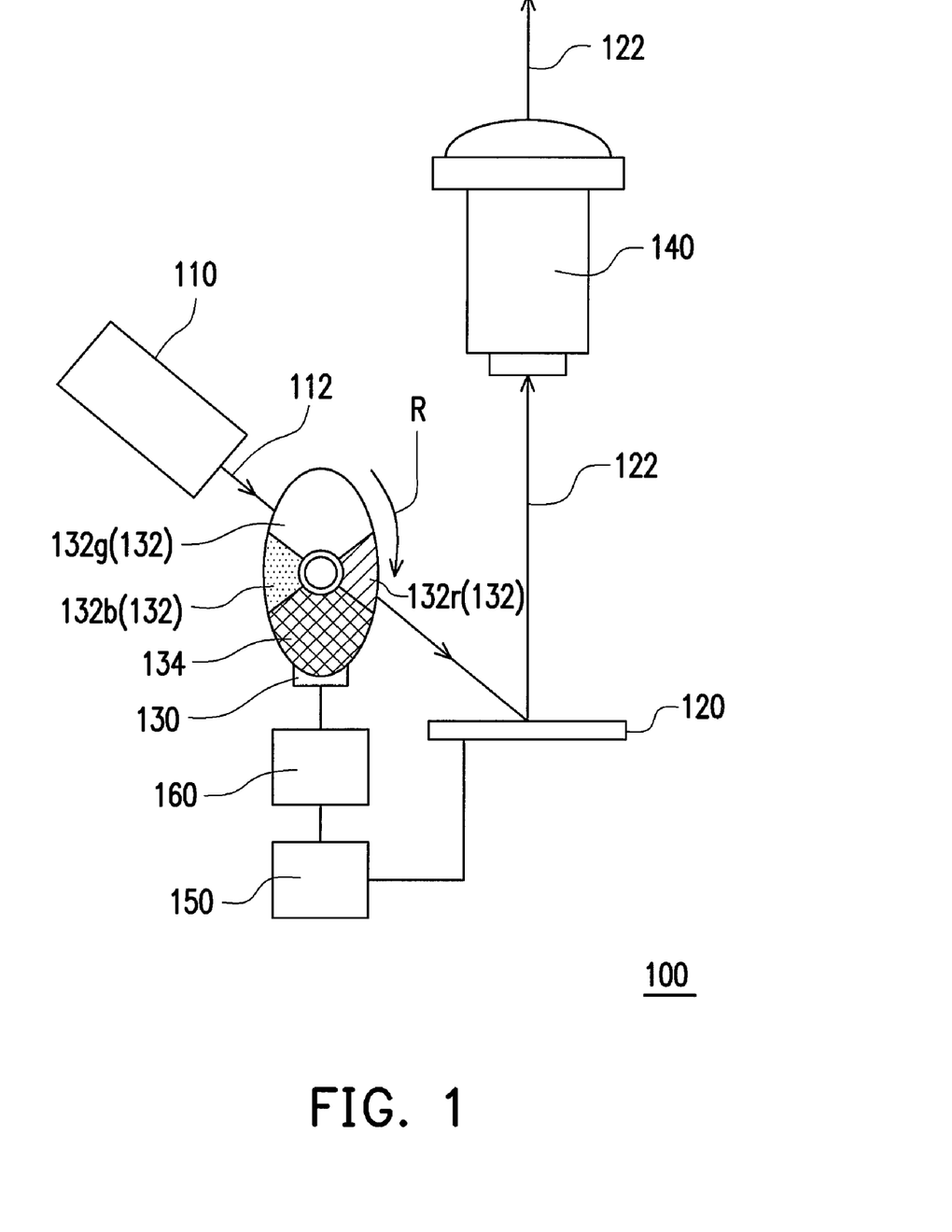
FIG. 1 is a schematic structural view of a projection apparatus according to an embodiment of the invention.
Figure 2:
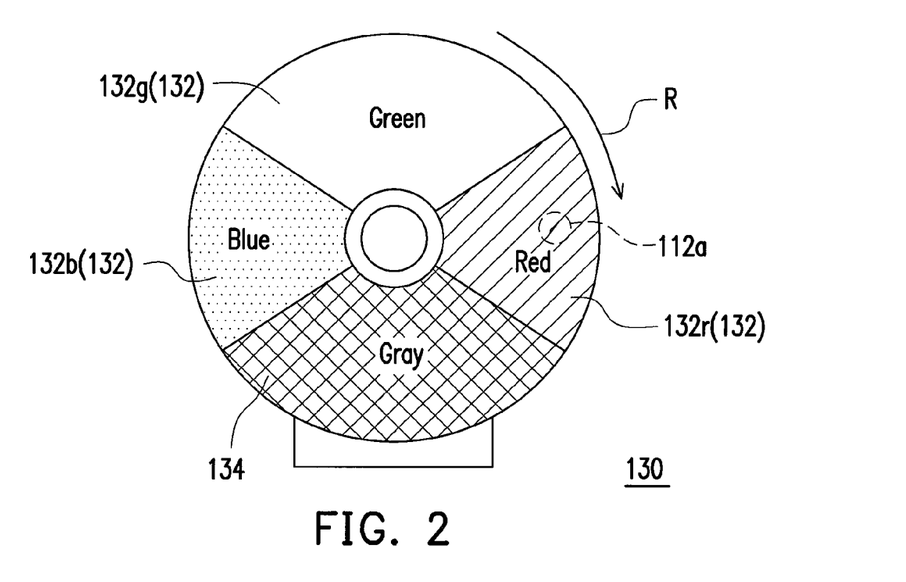
FIG. 2 is a front view of the color filtering module in FIG. 1.

FIG. 1 is a schematic structural view of a projection apparatus according to an embodiment of the invention, and FIG. 2 is a front view of the color filtering module in FIG. 1. Referring to FIG. 1 and FIG. 2, the projection apparatus 100 of this embodiment includes an illumination system 110, a light valve 120, and a color filtering module 130. The illumination system 110 is capable of emitting an illumination beam 112. The illumination beam 112 is a white beam, for example. The illumination system 110 may include light emitting diodes (LEDs), ultra high pressure lamp (UHP lamp), or other appropriate lamps. The light valve 120 is disposed in the transmission path of the illumination beam 112 and capable of converting the illumination beam 112 into an image beam 122. Specifically, the light valve 120 is, for example, a digital micro-mirror device (DMD), a liquid-crystal-on-silicon (LCOS) panel, a transmissive liquid crystal panel, or other appropriate spatial light modulators.

The color filtering module 130 is disposed in the transmission path of the illumination beam 112 between the illumination system 110 and the light valve 120 and includes a plurality of colored filters 132 and a gray filter 134. In this embodiment, the colored filters 132 include a red filter 132r, a green filter 132g, and a blue filter 132b. However, in other embodiments, the colored filters 132 may include a red filter, a green filter, a blue filter, a yellow filter, a magenta filter, a cyan filter, or any combination thereof. Besides, in other embodiments, the color filtering module 130 may also include a white filter (i.e. a colorless transparent filter). Moreover, in this embodiment, the gray filter 134 is a dark gray filter. The gray filter 134 is capable of reducing the intensity of the illumination beam 112 passing through the gray filter 134. Additionally, in this embodiment, the color filtering module 130 is a color wheel with the colored filters 132 and the gray filter 134 arranged annularly.

In this embodiment, the projection apparatus 100 further includes an image processing unit 150 and a controlling unit 160. The image processing unit 150 is capable of receiving an image signal, and is, for example an image processing chip or other electronic devices capable of processing images. The image signal is generated by a video player such as a computer, a DVD player, or a camera. The image signal may be input to the image processing unit 150 through a connector such as a CVBS port, an S Video port, a Component Video port, an Analog RGB port, or an HDMI port. The controlling unit 160 is electrically connected to the image processing unit 150 and the color filtering module 130.

Figure 3A:
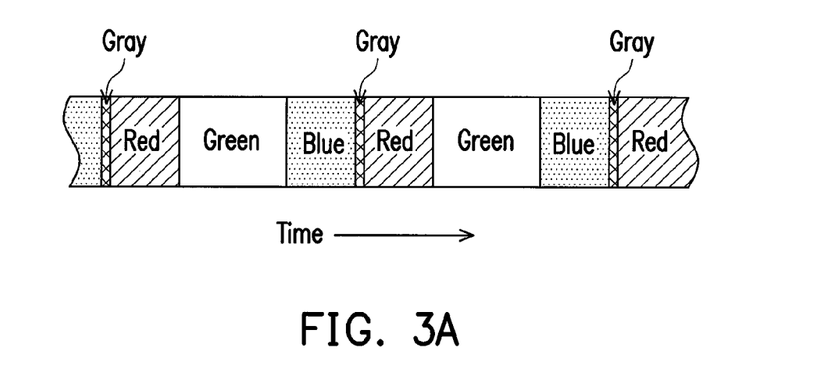
FIGS. 3A, 3B, 4, and 5 are color sequence and color distribution with respect to time of the projection apparatus of FIG. 1.

FIGS. 3A, 3B, 4, and 5 are color sequence and color distribution with respect to time of the projection apparatus of FIG. 1, wherein each of the colors shown in FIGS. 3A, 3B, 4 and 5 represents the color of the filter being in the transmission path of the illumination beam 112 at this time; that is, the color of the filter at the illumination region 112a struck by the illumination beam 112 on the color filter module 130 is located at this time. Referring to FIGS. 1, 2 and 3A, in this embodiment, when the image processing unit 150 judges that the average brightness of the image signal is greater than or equal to a first reference brightness, the controlling unit 160 commands the color filtering module 130 to make the colored filters 132 move into the transmission path of the illumination beam 112 in sequence and make the time for the gray filter passing through the transmission path of the illumination beam 112 less than the time for any of the colored filters 132 passing through the transmission path of the illumination beam 112. The average brightness of the image signal is an average gray level of a frame in the image signal, for example.

In this embodiment, the controlling unit 160 commands the color filtering module 130 to make the colored filters 132 and the gray filter 134 move into the transmission path of the illumination beam 112 in sequence, and the speed of the gray filter 134 passing through the transmission path of the illumination beam 112 is greater than the speed of any of the colored filters 132 passing through the transmission path of the illumination beam 112.

In detail, the color filtering module 130 rotates along a rotation direction R, such that the red filter 132r, the green filter 132g, the blue filter 132b, and the gray filter 134 move into the transmission path of the illumination beam 112 in sequence, for example.

Since the time for the gray filter 134 passing through the transmission path of the illumination beam 112 is short, the intensity of the illumination beam 112 is just reduced little by the gray filter 134. As a result, in this mode, called normal mode hereinafter, the projection apparatus 100 provides image frames with high brightness.

Figure 3B:
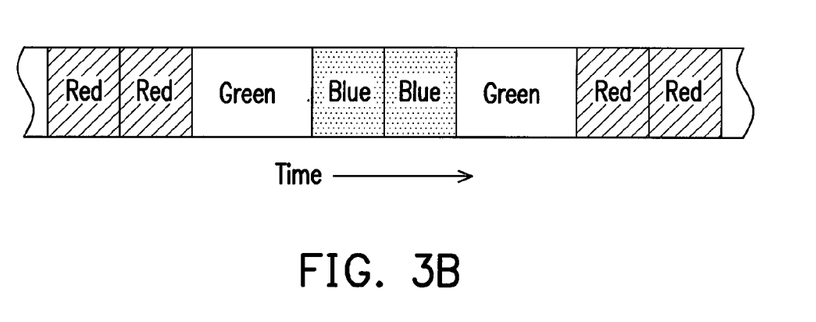

Referring to FIGS. 1A, 1B, and 3B, another normal mode may be as follows. In this embodiment, the controlling unit 160 commands the color filtering module 130 to make the colored filters 132 move into the transmission path of the illumination beam 112 in sequence and make the gray filter 134 not move into the transmission path of the illumination beam 112 when the image processing unit 150 judges that the average brightness of the image signal is greater than or equal to the first reference brightness. That is to say, the time for the gray filter 134 passing through the transmission path of the illumination beam 112 is zero.

In this embodiment, the controlling unit 160 commands the color filtering module 130 to rotate back and forth so as to make the colored filters 132 move into the transmission path of the illumination beam 112 back and forth when the average brightness of the image signal is greater than or equal to the first reference brightness.

Since the illumination beam 112 does not pass through the gray filter 134 in the normal mode of this embodiment, the image frames have high brightness. The value of the first reference brightness may be set by the manufacturer or user. The frame with an average brightness greater than or equal to the first reference brightness is defined as a normal frame, and the frame with an average brightness less than the first reference brightness is defined as a dark frame.

Figure 4:
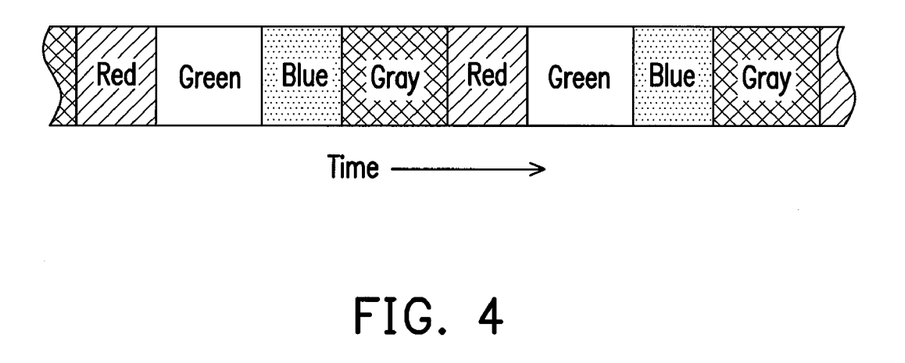

Referring to FIGS. 1, 2, and 4, in this embodiment, when the image processing unit 150 judges that the average brightness of the image signal is less than the first reference brightness and the image signal is not an all black frame signal, the controlling unit 160 commands the color filtering module 130 to make the colored filters 132 and the gray filter 134 move into the transmission path of the illumination 112 in sequence. The all black frame means that every pixel in the frame is black. In detail, the controlling unit 160 commands the color filtering module 130 to rotate at a constant speed, such that the illumination beam 112 passes through the gray filter 134 to generate a gray frame. The gray frame enhances the contrast of the image frame provided by the projection apparatus 100 when the image frame is a dark frame.

Figure 5:
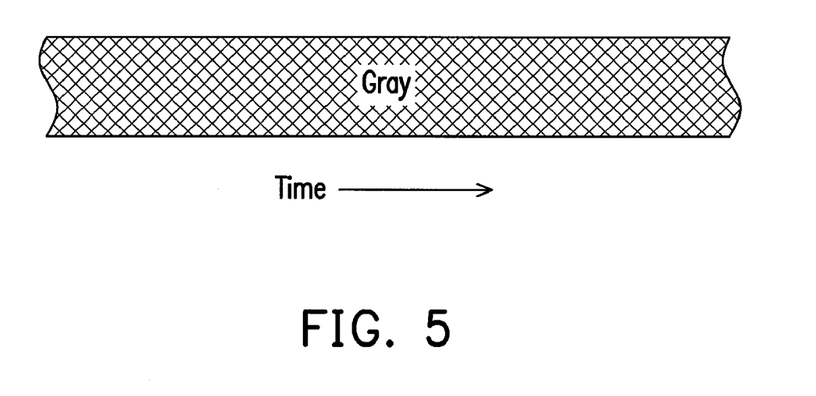

Referring to FIGS. 1, 2, and 5, in this embodiment, when the image processing unit 150 judges that the image signal is the all black frame signal, the controlling unit 160 commands the color filtering module 130 to make the, gray filter 134 maintained in the transmission path of the illumination beam 112. In this way, the dark frame provided by the projection apparatus 100 is darker, thus increasing the contrast of the image frames provided by the projection apparatus 100.

In this embodiment, the image processing unit 150 is also electrically connected to the light valve 120. The image processing unit 150 may use brightness compensation to adjust the image signal to an adjusted image signal when the image processing unit 150 judges that the average brightness of the image signal is less than the first reference brightness. The image processing unit 150 may send the adjusted image signal to the light valve 120 when the image processing unit 150 judges that the image signal is not the all black frame signal.

In this embodiment, the image processing unit 150 sets a gain of the image signal to be 1 when the image processing unit 150 judges that the average brightness of the image signal is greater than a second reference brightness, wherein the second reference brightness is less than the first reference brightness, and the adjusted brightness is equal to the original brightness multiplied by the gain. The gain may correspond to the gamma, brightness, or contrast function, but the invention is not limited thereto.

Besides, the image processing unit 150 sets the gain of the image signal to be N when the image processing unit 150 judges that the average brightness of the image signal is less than a third reference brightness, wherein the third reference brightness is less than the second reference brightness, and N is greater than 1. The image processing unit 150 sets the gain of the image signal to be a value found in a look-up table when the image processing unit judges that the average brightness is not greater than the second reference brightness and not less than the third reference brightness, and the value found in the look-up table is greater than 1 and less than N. The look-up table may be made by watching many videos and finding the better gain through which the image frames become better.

Figure 6:
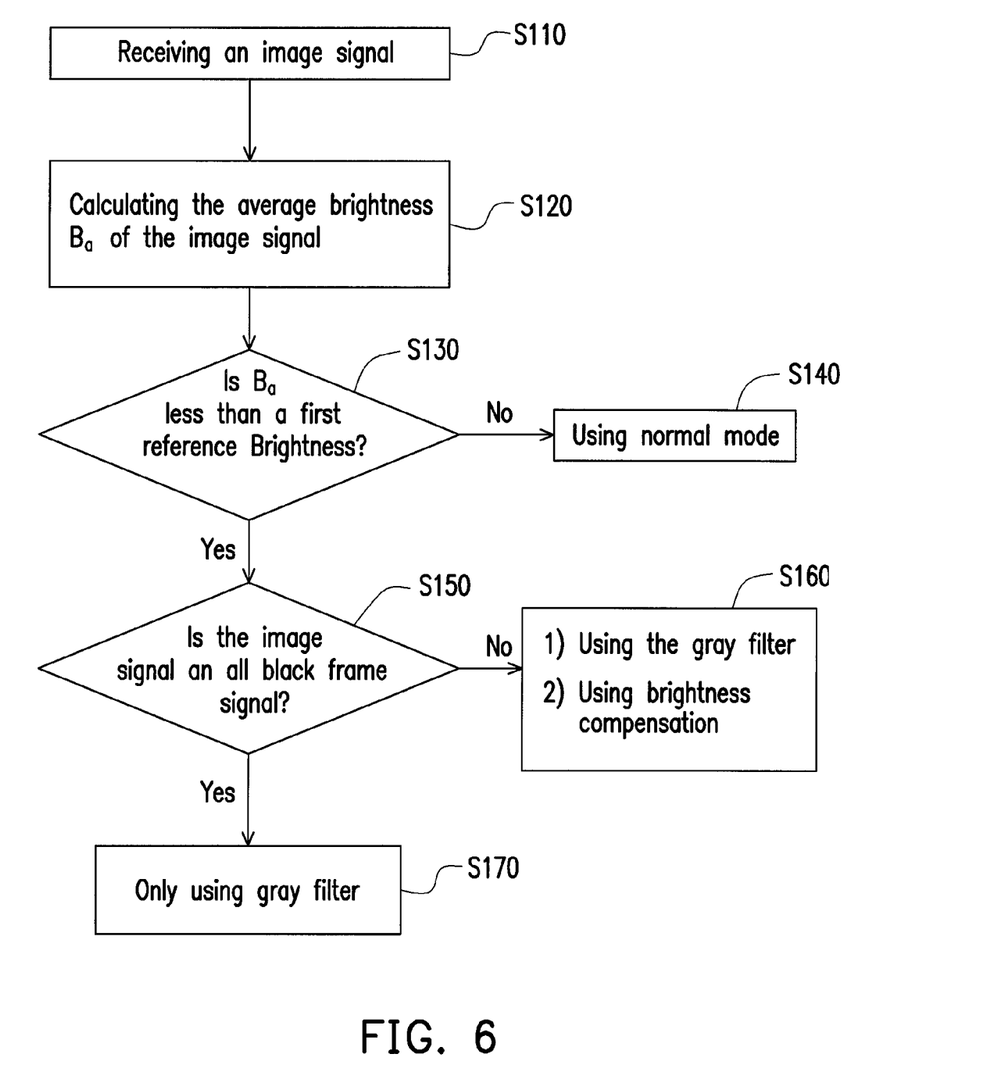
FIGS. 6 and 7 are flow charts of an image adjustment method according to am embodiment of the embodiment.
Figure 7:
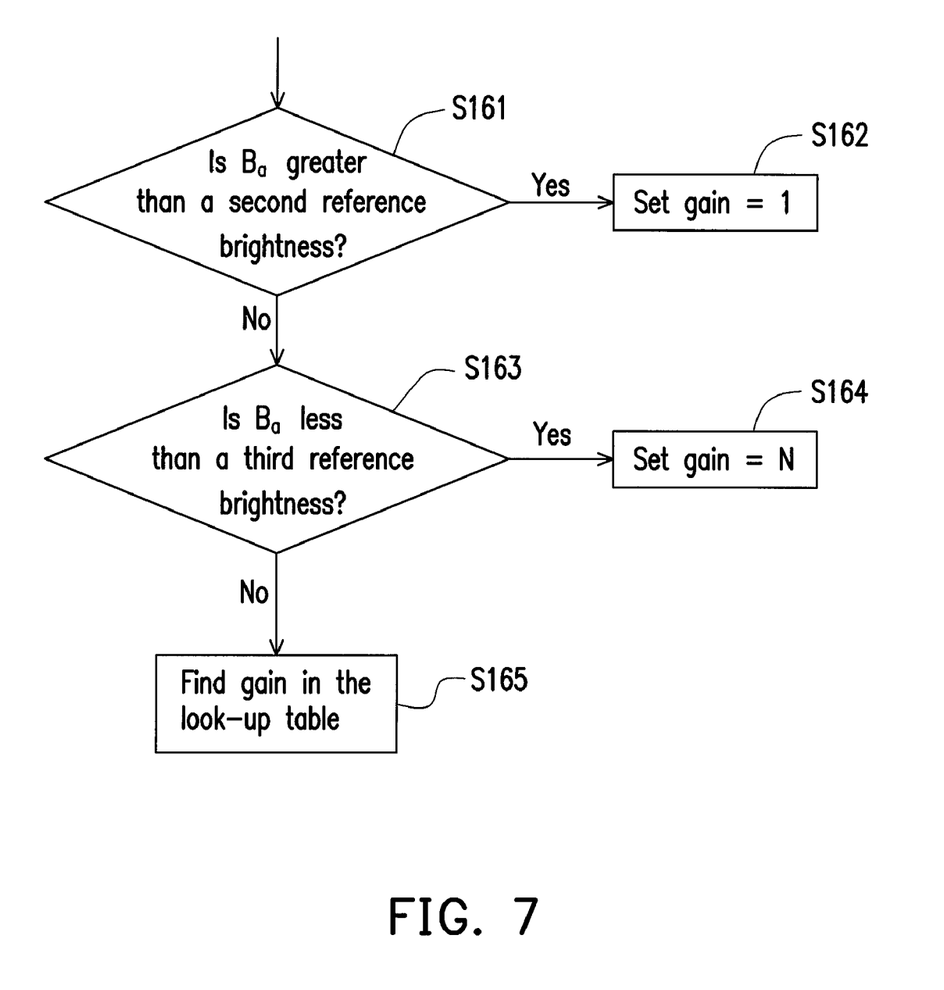

FIGS. 6 and 7 are flow charts of an image adjustment method according to am embodiment of the embodiment. Referring to FIGS. 1, 6 and 7, the image adjustment method of this embodiment is adapted for a projection apparatus, for example, the above projection apparatus 100, and includes the following steps.

First, step S110 is executed, wherein step S110 is receiving an image signal. Next, step S120 is executed, wherein step S120 is calculating an average brightness $B_a$ of the image signal. The steps S110 and S120 may be executed by the above image processing unit 150. Then, it is judged whether the average brightness is greater than or equal to the first reference brightness, whether the image signal is the all black frame signal, or whether the average brightness is less than the first reference brightness. In this embodiment, after step S120, step S130 is executed, wherein step S130 is judging whether the average brightness $B_a$ is less than the first reference brightness. If no, the normal mode is used (step 140). If yes, step S150 is executed. The normal mode is described hereinbefore. Since in the normal mode, the illumination beam 112 does not pass through the gray filter 134, or passes through the gray filter 134 for a short time, the image frames provided by the projection apparatus 100 have higher brightness. Step S150 is judging whether the image signal is the all black frame signal. If no, step S160 is executed. If yes, step S170 is executed. Steps S130 and S150 may be executed by the image processing unit 150, and steps S140, S160, and S170 may be executed by the controlling unit 160. Step S160 may include commanding the color filtering module 130 to make the colored filters 132 and the gray filter 134 move into the transmission path of the illumination 112 in sequence. The detail may be found in FIG. 4 and the above descriptions corresponding thereto. In this way, the contrast of the image frames is increased. Step 170 is commanding the color filtering module 130 to make the gray filter 134 maintained in the transmission path of the illumination beam 112, such that the black frame provided by the projection apparatus 100 is darker.

It should be noted that the invention is not intended to limit the execution sequence to shown in FIG. 6. In other embodiments, the step S150 may be executed before step S130. If the result of step S150 is yes, step S170 is executed; if the result of step S150 is no, step S130 is executed. Then, if the result of step S130 is yes, step S160 is executed; if the result of step S130 is no, step S140 is executed. In still other embodiments, steps S150 and S130 may be executed at the same time, that is judging whether the average brightness is greater than or equal to the first reference brightness, whether the image signal is the all black frame signal, or whether the average brightness is less than the first reference brightness at the same time.

In this embodiment, step 160 may also include using brightness compensation as described hereinbefore, and the detail of step 160 is shown in FIG. 7. Step 160 may include the following steps. First, step S161 is executed, wherein step S161 is judging whether the average brightness $B_a$ is greater than the second reference brightness as described above. If yes, step S162 is executed, wherein step S162 sets the gain to be 1. If no, step S163 is executed. Step S163 is judging whether the average brightness $B_a$ is less than a third reference brightness. If yes, step S164 is executed, wherein step S164 sets the gain to be N. If no, step S165 is executed, wherein step S165 is finding the gain in the look-up table. The detail of steps S162, S164, and S165 is described in the above paragraph and omitted herein. Steps S161 through S165 may be executed by the image processing unit 5150. After that, the adjusted brightness may be sent to the light valve 120.

It should be noted that the invention is not intended to limit the execution sequence to shown in FIG. 7. In other embodiments, the step S163 may be executed before step S131. If the result of step S163 is yes, step S164 is executed; if the result of step S163 is no, step S161 is executed. Then, if the result of step S161 is yes, step S162 is executed; if the result of step S161 is no, step S165 is executed. In still other embodiments, steps S161 and S163 may be executed at the same time that is judging whether the average brightness is greater than the second reference brightness, or whether the average brightness is less than the third reference brightness at the same time.

In view of the above, the embodiment or embodiments of the invention may have at least one of the following advantages: the projection apparatus according to the embodiment of the invention, since the color filtering module has a gray filter to reduce the intensity of the illumination beam passing through the gray filter, the image frames provided by the projection apparatus have higher contrast. In the image adjustment method according to the embodiment of the invention, since the gray filter moves into the transmission path of the illumination beam to reduce the intensity of the illumination beam when the average brightness of the image signal is less than the first reference brightness, the image frames provided by the projection apparatus have higher contrast.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus comprising:
an illumination system capable of emitting an illumination beam;
a light valve disposed in the transmission path of the illumination beam and capable of converting the illumination beam into an image beam;
a color filtering module disposed in the transmission path of the illumination beam between the illumination system and the light valve and comprising a plurality of colored filters and a gray filter, wherein the gray filter is capable of reducing the intensity of the illumination beam passing through the gray filter;
an image processing unit capable of receiving an image signal; and
a controlling unit electrically connected to the image processing unit and the color filtering module;
wherein the controlling unit commands the color filtering module to make the colored filters move into the transmission path of the illumination beam in sequence and make the time for the gray filter passing through the transmission path of the illumination beam less than the time for any of the colored filters passing through the transmission path of the illumination beam when the image processing unit judges that the average brightness of the image signal is greater than or equal to a first reference brightness.

2. The projection apparatus according to claim 1, wherein the controlling unit commands the color filtering module to make the colored filters and the gray filter move into the transmission path of the illumination in sequence when the image processing unit judges that the average brightness of the image signal is less than the first reference brightness and the image signal is not an all black frame signal.

3. The projection apparatus according to claim 2, wherein the color filtering module is a color wheel with the colored filters and the gray filter arranged annularly, and the controlling unit commands the color filtering module to rotate at a constant speed when the image processing unit judges that the average brightness of the image signal is less than the first reference brightness and the image signal is not an all black frame signal.

4. The projection apparatus according to claim 1, wherein the controlling unit commands the color filtering module to make the gray filter maintained in the transmission path of the illumination beam when the image processing unit judges that the image signal is an all black frame signal.

5. The projection apparatus according to claim 1, wherein the controlling unit commands the color filtering module to make the colored filters move into the transmission path of the illumination beam in sequence and make the gray filter not move into the transmission path of the illumination beam when the image processing unit judges that the average brightness of the image signal is greater than or equal to the first reference brightness.

6. The projection apparatus according to claim 5, wherein the color filtering module is a color wheel with the colored filters and the gray filter arranged annularly, and the controlling unit commands the color filtering module to rotate back and forth so as to make the colored filters move into the transmission path of the illumination beam back and forth when the image processing unit judges that the average brightness of the image signal is greater than or equal to the first reference brightness.

7. The projection apparatus according to claim 1, wherein the controlling unit commands the color filtering module to make the colored filters and the gray filter move into the transmission path of the illumination beam in sequence when the image processing unit judges that the average brightness of the image signal is greater than or equal to the first reference brightness, and wherein the speed of the gray filter passing through the transmission path of the illumination beam is greater than the speed of any of the colored filters passing through the transmission path of the illumination beam.

8. The projection apparatus according to claim 1, wherein the image processing unit is electrically connected to the light valve, the image processing unit uses brightness compensation to adjust the image signal to an adjusted image signal when the image processing unit judges that the average brightness of the image signal is less than the first reference brightness and the image processing unit sends the adjusted image signal to the light valve when the image processing unit judges that the image signal is not an all black frame signal.

9. The projection apparatus according to claim 8, wherein the image processing unit sets a gain of the image signal to be 1 when the image processing unit judges that the average brightness of the image signal is greater than a second reference brightness, the second reference brightness is less than the first reference brightness, the image processing unit sets the gain of the image signal to be N when the image processing unit judges that the average brightness of the image signal is less than a third reference brightness, the third reference brightness is less than the second reference brightness, N is greater than 1, the image processing unit sets the gain of the image signal to be a value found in a look-up table when the image processing unit judges that the average brightness is not greater than the second reference brightness and not less than the third reference brightness, and the value found in the look-up table is greater than 1 and less than N.

10. The projection apparatus according to claim 1, wherein the colored filters comprise a red filter, a green filter, and a blue filter.

11. An image adjustment method for a projection apparatus, the image adjustment method comprising:
   receiving an image signal;
   calculating an average brightness of the image signal;
   commanding a color filtering module of the projection apparatus to make a plurality of colored filters of the color filtering module move into the transmission path of an illumination beam emitted by an illumination system of the projection apparatus and make the time for a gray filter of the color filtering module passing through the transmission path of the illumination beam less than the time for any of the colored filters passing through the transmission path of the illumination beam if the average brightness is greater than or equal to a first reference brightness; and
   commanding the color filtering module to make the colored filters and the gray filter move into the transmission path of the illumination beam in sequence if the average brightness is less than the first reference brightness and if the image signal is not an all black frame signal.

12. The image adjustment method according to claim 11 further comprising commanding the color filtering module to maintain the gray filter in the transmission path of the illumination beam if the image signal is the all black frame signal.

13. The image adjustment method according to claim 11, wherein the color filtering module is a color wheel with the colored filters and the gray filter arranged annularly, and the color filtering module is commanded to rotate at a constant speed if the average brightness of the image signal is less than the first reference brightness and the image signal is not the all black frame signal.

14. The image adjustment method according to claim 11, wherein the color filtering module is commanded to make the colored filters move into the transmission path of the illumination beam in sequence and make the gray filter not move into the transmission path of the illumination beam if the average brightness of the image signal is greater than or equal to the first reference brightness.

15. The image adjustment method according to claim 14, wherein the color filtering module is a color wheel with the colored filters and the gray filter arranged annularly, and the color filtering module is commanded to rotate back and forth so as to make the colored filters move into the transmission path of the illumination beam back and forth if the average brightness of the image signal is greater than or equal to the first reference brightness.

16. The image adjustment method according to claim 11, wherein the color filtering module is commanded to make the colored filters and the gray filter move into the transmission path of the illumination beam in sequence when the average brightness of the image signal is greater than or equal to the first reference brightness, and wherein the speed of the gray filter passing through the transmission path of the illumination beam is greater than the speed of any of the colored filters passing through the transmission path of the illumination beam.

17. The image adjustment method according to claim 11 further comprising:
   using brightness compensation to adjust the image signal to an adjusted image signal if the average brightness of the image signal is less than the first reference brightness and if the image signal is not the all black frame signal; and
   sending the adjusted image signal to a light valve of the projection apparatus.

18. The image adjustment method according to claim 17, wherein the brightness compensation comprises:
   setting a gain of the image signal to be 1 if the average brightness of the image signal is greater than a second reference brightness, wherein the second reference brightness is less than the first reference brightness;
   setting the gain of the image signal to be N if the average brightness of the image signal is less than a third reference brightness, wherein the third reference brightness is less than the second reference brightness, and N is greater than 1; and
   setting the gain of the image signal to be a value found in a look-up table if the average brightness is not greater than the second reference brightness and not less than the third reference brightness, wherein the value found in the look-up table is greater than 1 and less than N.

19. The image adjustment method according to claim 11, wherein the colored filters comprise a red filter, a green filter, and a blue filter.

* * * * *